(12) United States Patent
Kim

(10) Patent No.: US 7,460,478 B2
(45) Date of Patent: Dec. 2, 2008

(54) METHOD AND APPARATUS FOR SELECTIVELY TRANSMITTING IMAGE OF MOBILE COMMUNICATION TERMINAL

(75) Inventor: Hag Soo Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 897 days.

(21) Appl. No.: 10/873,106

(22) Filed: Jun. 23, 2004

(65) Prior Publication Data

US 2004/0264375 A1    Dec. 30, 2004

(30) Foreign Application Priority Data

Jun. 24, 2003    (KR)   ...................... 10-2003-0041268

(51) Int. Cl.
     *H04L 12/26*      (2006.01)
(52) U.S. Cl. ....................................... 370/232
(58) Field of Classification Search ................ 370/229, 370/230, 232, 233, 234, 235, 236, 230.1, 370/235.1, 493, 497, 529
See application file for complete search history.

(56) References Cited

U.S. PATENT DOCUMENTS

| | | | |
|---|---|---|---|
| 2002/0055372 A1* | 5/2002 | Motohashi | 455/566 |
| 2002/0140851 A1* | 10/2002 | Laksono | 348/388.1 |
| 2003/0091000 A1* | 5/2003 | Chu et al. | 370/230 |
| 2004/0233844 A1* | 11/2004 | Yu et al. | 370/230 |

FOREIGN PATENT DOCUMENTS

| | | |
|---|---|---|
| JP | 02-104081 | 4/1990 |
| JP | 09-098397 | 4/1997 |
| JP | 2000-069092 | 3/2000 |
| JP | 2002-125263 | 4/2002 |
| JP | 2002-141944 | 5/2002 |
| JP | 2002-320225 | 10/2002 |
| KR | 2003-0048509 | 6/2003 |

OTHER PUBLICATIONS

Japanese Office Action.

* cited by examiner

*Primary Examiner*—Ricky Ngo
*Assistant Examiner*—Wei-Po Kao
(74) *Attorney, Agent, or Firm*—Ked & Associates, LLP

(57) ABSTRACT

A method and apparatus implements video telephony by selectively transmitting voice and image signals from a mobile terminal. The method includes comparing a network transmission rate to a pre-set threshold value, and if the transmission rate is not greater than the threshold value blocking transmission of a moving picture signal derived from a terminal camera and transmitting a still image. The still image may be mixed with a voice signal prior to transmission, or the still image may be transmitted alone after which voice signal transmission may resume. Thus, even when transmission of a moving picture signal is not possible due to a low transmission rate of the wireless network, video telephony can be implemented by transmitting a still image selected by the user.

17 Claims, 4 Drawing Sheets

METHOD AND APPARATUS FOR SELECTIVELY TRANSMITTING IMAGE OF MOBILE COMMUNICATION TERMINAL

BACKGROUND OF THE INVENTION

1. Field of the Invention

The present invention generally relates to a communication system, and more particularly to a method and apparatus for selectively transmitting images in a mobile communication system.

2. Background of the Related Art

Video telephony is one of many services provided by third-generation mobile communication terminals. Video telephony is a circuit-switched service in which image and voice information is simultaneously transmitted after a bearer is set at a fixed rate. Through this service, the calling party can execute a call while viewing an image of the called party.

In implementing video telephony in a mobile terminal, both voice data of the user and image data input through a camera are transmitted. The transmission ratio of this data follows the transmission rate required by the network.

FIG. 1 shows a video telephony apparatus included in a mobile terminal. A signal flow through this apparatus is also shown. The apparatus includes an input selector 10 for inputting an image signal and a voice signal from a camera (not shown) and microphone (not shown) respectively, a video codec unit 20 for coding the image signal, an audio codec unit 30 for coding the voice signal, and a multiplexer 40 for mixing the coded image signal and voice signal. The apparatus also includes a radio communication unit 50 for transmitting an output signal of the multiplexer 40 to a network 200, and a controller 60 for controlling general operations of the elements used to transmit the image signal and voice signal.

The video telephony apparatus operates as follows. An image signal input through an internal or external camera of the terminal and a voice signal input through a microphone (not shown) are respectively coded to a transmittable form, mixed in the multiplexer, and then transmitted to the wireless network through the radio communication unit.

The signal flow shown in FIG. 1 is a general signal flow set at such a rate that a transmitter in the network could transmit both an image and voice. That is, the input selector selects and inputs both an image signal and voice signal. The input image signal is coded into a signal to be transmitted through the video codec unit, and the voice signal is coded into a signal to be transmitted through the audio codec unit. The coded signals are then mixed in the multiplexer unit under control of the controller. The mixed signal is then transmitted to the wireless network through the radio communication unit, and the wireless network transmits the corresponding signal to a receiver's mobile communication terminal, where the receiver can simultaneously check the image and voice provided from the transmitter.

Because traffic in the network continuously changes, an image may not always be able to be transmitted. This is true especially if the network is set at a low transmission rate. For example, if the wireless network environment is not good, some image frames transmitted as frame data may be lost and thus a broken image will be received. The image frames transmitted as frame data may correspond to a moving picture derived from a terminal camera. Also, if network conditions are not good, still images may be irregularly transmitted or only voice signals may be transmitted regardless of the type of signals transmitted from the transmitter.

The aforementioned video telephony method therefore has at least the following problems. Since image data within a frame structure is transmitted in spite of a bad transmission environment of the network, the image data may be partially lost and thus a broken image may be received. Or, a still image that the user does not intend to send may be transmitted. Also, if the transmission rate of the network is set to a lowest value, only voice signals can be transmitted. This eliminates or at least diminishes the ability to provided video telephony services in a mobile terminal.

SUMMARY OF THE INVENTION

An object of the invention is to solve at least the above problems and/or disadvantages and to provide at least the advantages described hereinafter.

Another object of the present invention is to provide a method and apparatus for selectively transmitting an image of a mobile communication terminal capable of selectively implementing video telephony, by providing a voice signal or a still image desired to be transmitted by a user when, for example, the transmission rate of the wireless network is insufficiently low.

To achieve at least the above objects and advantages in whole or part, the present invention provides a method and apparatus for selectively transmitting an image from a mobile communication terminal, which is equipped with a video telephony service. This is accomplished by determining whether a transmission rate of a wireless network is not greater than a pre-set threshold value, and then cutting off an image frame and transmitting a user-selected still image if the transmission rate is not greater than the threshold value.

In accordance with another embodiment, the present invention provides a method and apparatus for selectively transmitting an image from a mobile communication terminal, by determining whether a transmission rate requested from a wireless network is not greater than a pre-set threshold value, and if the transmission rate is not greater than the threshold value, a user is informed accordingly. The method also includes cutting off an input of an image frame, and if the user selects a still image a check is performed to determine whether the wireless network has a predetermined (e.g., a lowest) transmission rate. A still image is then transmitted based on the result.

In accordance with another embodiment, the present invention provides an apparatus for selectively transmitting an image from a mobile communication terminal, which codes input voice and image signals and transmits them through a wireless network. The apparatus includes a controller for comparing a transmission rate of the wireless network with a pre-set threshold value and outputting a control signal for selectively cutting off an input signal based on a result of the comparison. An input selector is also provided for cutting off the input signal according to the control signal.

DETAILED DESCRIPTION OF PREFERRED EMBODIMENTS

A method and apparatus for selectively transmitting image information from of a mobile communication terminal in accordance with a preferred embodiment of the present invention will now be described with reference to the drawings.

In a mobile communication system, a wireless network provides a QoS (Quality of Service) signal to a mobile terminal requesting the terminal to re-set its transmission rate. Before receiving the QoS signal, the terminal may be set to perform a video telephony service according to resources that the wireless network itself can currently accommodate. Upon receiving the QoS signal, the mobile terminal changes the number of frames of image data according to the requested transmission rate, transmits the image data according to the corresponding transmission rate, and then performs video telephony. As a fall back situation to be implemented when the radio network is short of resources, the mobile terminal may not transmit image data but only a voice signal.

In implementing the present invention, video telephony in a mobile terminal may be performed by transmitting: (a) a voice signal and an image signal simultaneously, (b) a voice signal and a still image signal simultaneously, or (c) only a voice signal according to a set or requested transmission rate.

Figure 1:
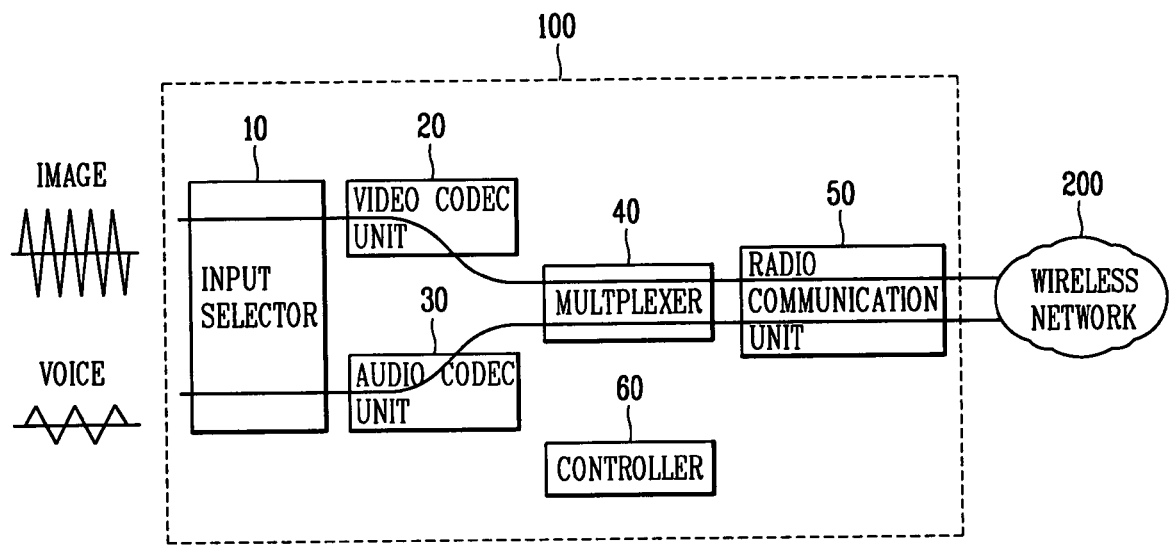
FIG. 1 is a diagram showing a video telephony apparatus in a mobile communication terminal and a signal flow path implemented.
Figure 2:
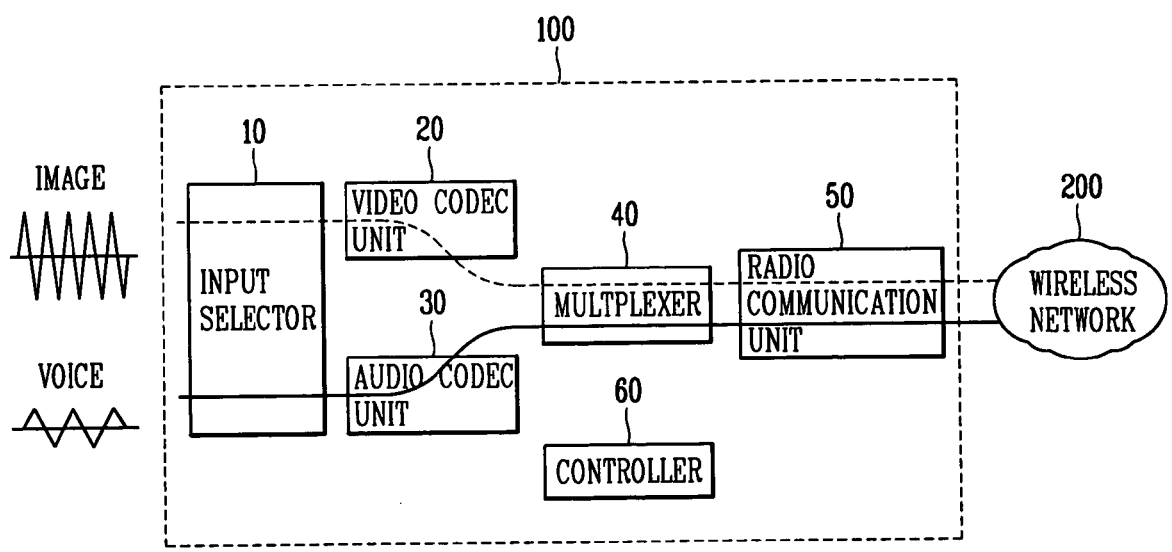
FIG. 2 is a diagram showing a video telephony apparatus and an accompanying signal flow in accordance with a first embodiment of the present invention.

FIG. 2 shows how video telephony may be performed in a mobile terminal in accordance with a first embodiment of the present invention. In this embodiment, a voice signal and still image signal are simultaneously transmitted from the mobile terminal.

Initially, a controller 40 compares a transmission rate requested from wireless network 200 with a threshold value that has been previously set for simultaneously transmitting voice and image signals. If the network-requested transmission rate is not greater than the pre-set threshold value, the controller informs a user of the mobile terminal that normal video telephony is not possible. In this case, only voice communication is maintained, i.e., no video telephony image frames are transmitted that can cause an error if transmitted. That is, input selector 10 cuts off an image frame input through a camera (not shown) of the mobile communication terminal.

If the user captures a still image desired to be transmitted through a key manipulation, the corresponding still image is input to video codec unit 20 through input selector 10 and coded, mixed with a voice signal input through the input selector in multiplexer 40, and then transmitted. In this case, the still image may be smaller than the image frame. The still frame may be one pre-stored in a memory of the terminal, or one captured or input by a user, for example, after the user is informed that normal video telephony is not possible.

Accordingly, in the first embodiment if the transmission rate of the wireless network is low or otherwise below the pre-set threshold value, a still image selected by the user is transmitted in place of the image frames from the terminal camera, that would otherwise be transmitted during normal video telephony. The amount of data to be transmitted can therefore be reduced compared to other methods which continuously transmit an image frame regardless of the transmission rate. Thus, improved transmission quality of an image desired by the user can be guaranteed.

Figure 3A:
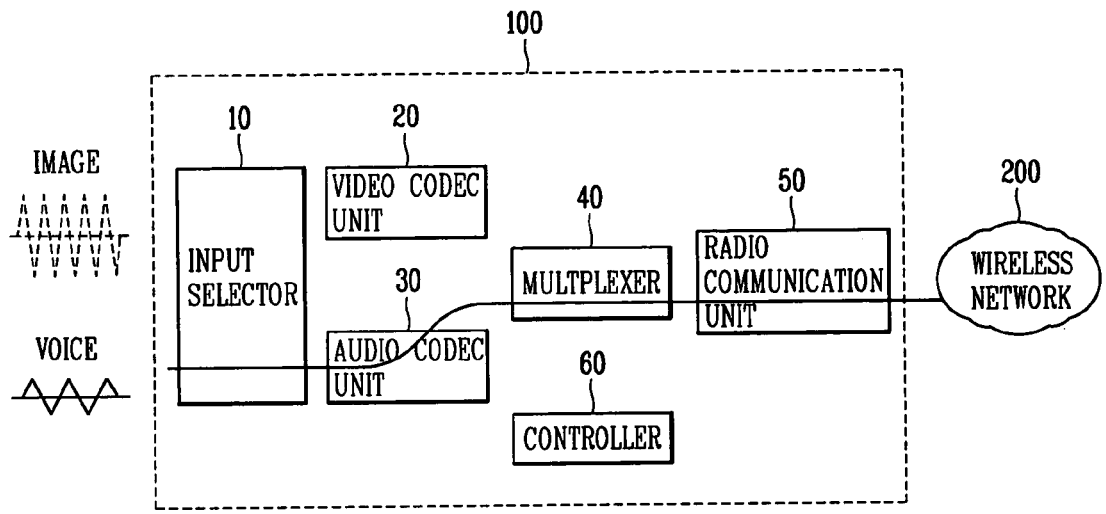
FIGS. 3A and 3B are diagrams showing a video telephony apparatus and an accompanying signal flow in accordance with a second embodiment of the present invention.
Figure 3B:
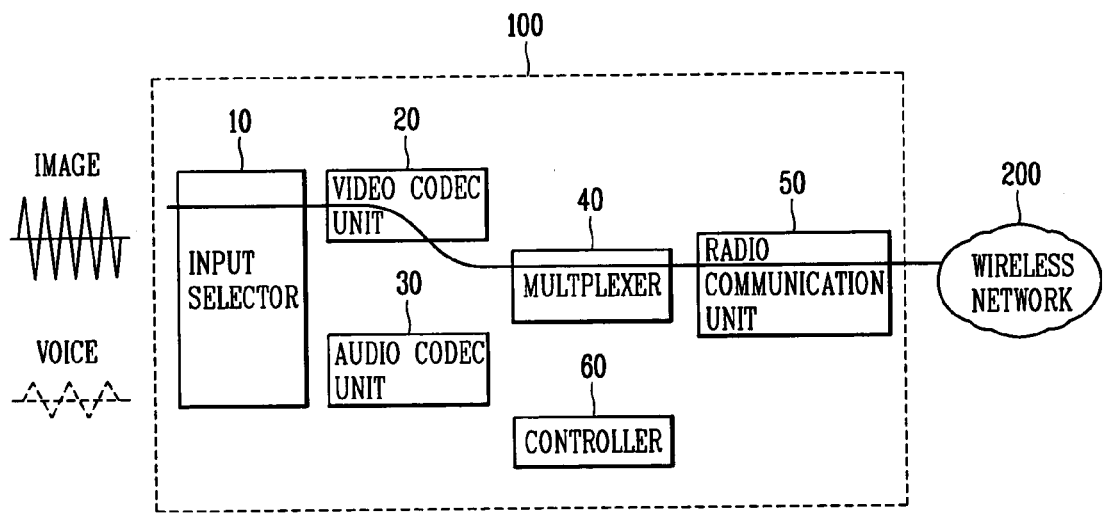

FIGS. 3A and 3B show how video telephony may be performed in a mobile terminal in accordance with a second embodiment of the present invention. This embodiment may be implemented, for example, as a fall back situation in which the wireless network can transmit only voice signals.

As shown in FIG. 3A, when this fall back situation occurs and it is requested (e.g., through a QoS signal) that a transmitter is to be set at a lowest or other desired transmission rate, the user of the mobile terminal is informed that normal video telephony is not possible. The input selector then cuts off image frames input through the camera (not shown), to thereby allow only voice telephony to be performed.

Then, the user selects a still image desired to be transmitted through a key manipulation, as shown in FIG. 3B, the input selector cuts off the voice signal, receives only the corresponding still image, and transmits it.

When transmission of the still image is terminated, the input selector cuts off the image frame input through the camera (not shown) and returns to a state where only the voice signal can be transmitted. In this embodiment, because the voice signal and the still image are selectively transmitted according to a user's selection, the uplink voice signal by the user is cut off while the still image is transmitted.

Figure 4:
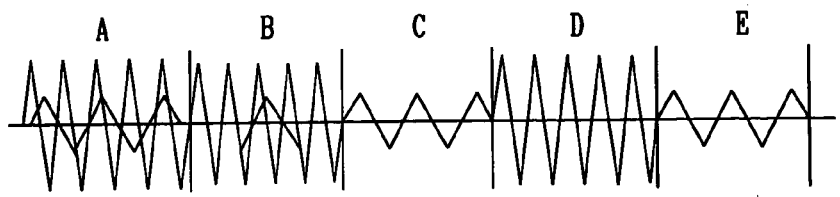
FIG. 4 is a graph illustrating a change of a transmission signal according to a time sequence.

FIG. 4 a graph showing how a transmission signal may change over a time sequence. Section A corresponds to a general case where both an image signal and voice signal are transmitted. Section B corresponds to a case where a voice signal and a still image signal identified according to user's selection are simultaneously transmitted. Sections C, D and E correspond to cases where the fall back situations previously maintained occur.

More specifically, section C corresponds to a case where only a voice signal is transmitted in the fall back situation where a signal is transmitted at a lowest transmission rate. Section D corresponds to a case where transmission of a voice is interrupted and only a still image is transmitted as the user selects a still image while the voice signal is transmitted. Section E corresponds to a case where transmission of a still image is terminated and only a voice signal is again transmitted.

Figure 5:
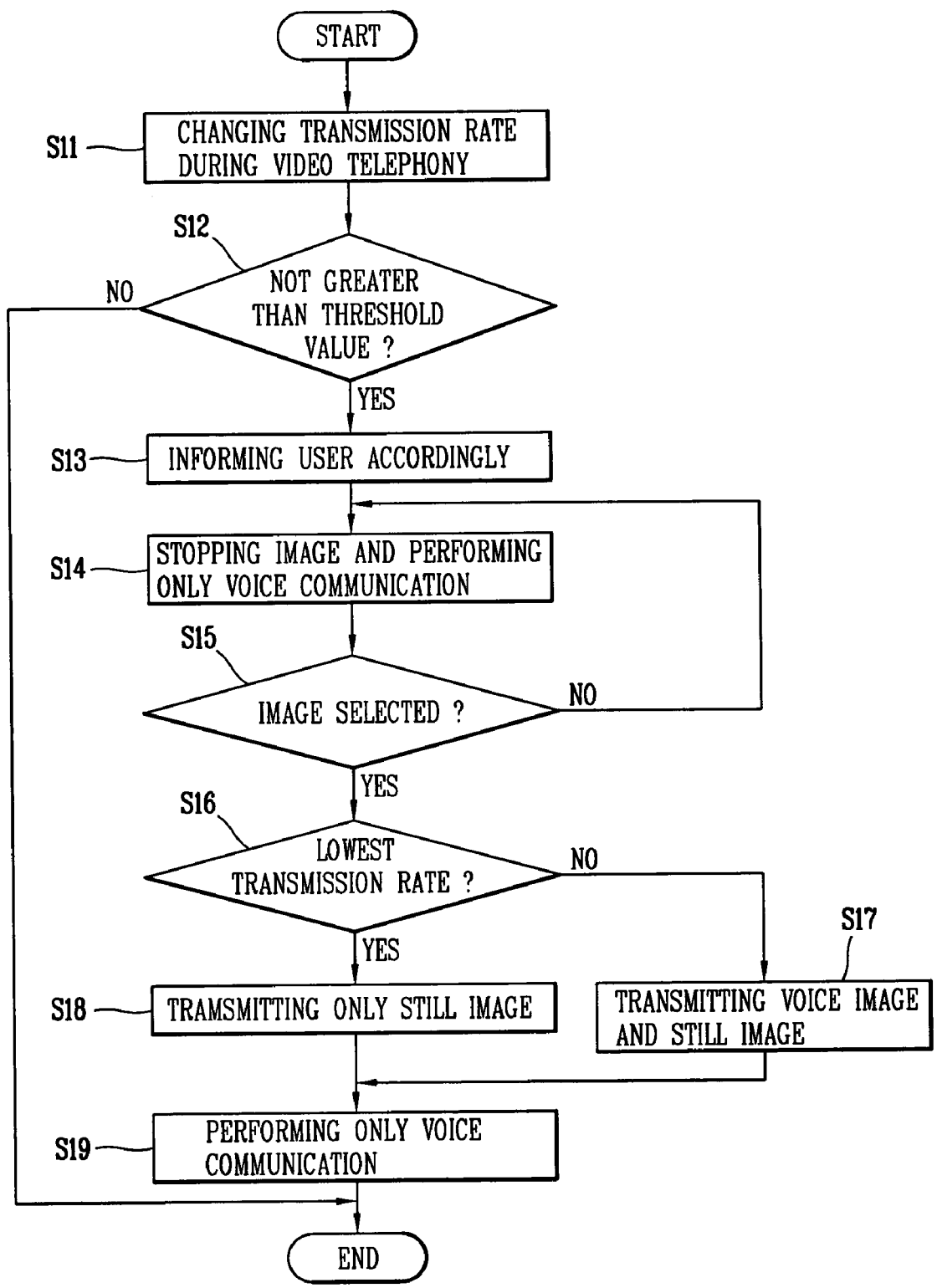
FIG. 5 is a flow chart showing steps included in a method for selectively transmitting image information from a mobile communication terminal in accordance with one embodiment of the present invention.

FIG. 5 is a flow chart showing steps included in a method for selectively transmitting an image from a mobile terminal in accordance with a video telephony service provided by the present invention. Normal telephony may be considered to be performed when voice and image signals (e.g., image frame data input derived from a terminal camera) are simultaneously transmitted from the mobile terminal 100. If a transmission rate change request signal is received from the wireless network (step S11), the transmission rate is compared to a first pre-set threshold value (step S12). The first threshold value may correspond to the lowest transmission rate capable of transmitting a mixed signal containing voice data and image frame data through the network. The first threshold value therefore signifies a transmission rate at which there is a high possibility of occurrence of an error if image frame data is transmitted.

If the changed transmission rate is higher than the first pre-set threshold value, the transmission rate of the network is changed to the corresponding transmission rate and the general video telephony transmitting the voice signal and the image signal is continuously performed.

However, if the changed transmission rate is not more than the first pre-set threshold value, the user of the mobile terminal may be informed of the current situation of the wireless network for his/her recognition (step S13). In this case, a selective image transmission situation for preventing a transmission error occurrence due to degradation of the transmission rate and the selective image transmission situation according to the lowest transmission rate are discriminated.

After the user is informed of the wireless network situation, the input selector 10 of the mobile terminal cuts off the image signal input through the camera (not shown), receives only the voice signal and transmits it to the wireless network (step S14).

During this time, it is determined whether the user has selected a still image desired to be transmitted through a key manipulation (step S15). If the user selects the still image, it is determined whether the current transmission rate of the wireless network is not greater than a second pre-set threshold value, e.g., a lowest transmission rate required to transmit only a voice signal through the network. (step S16).

Figure 6:
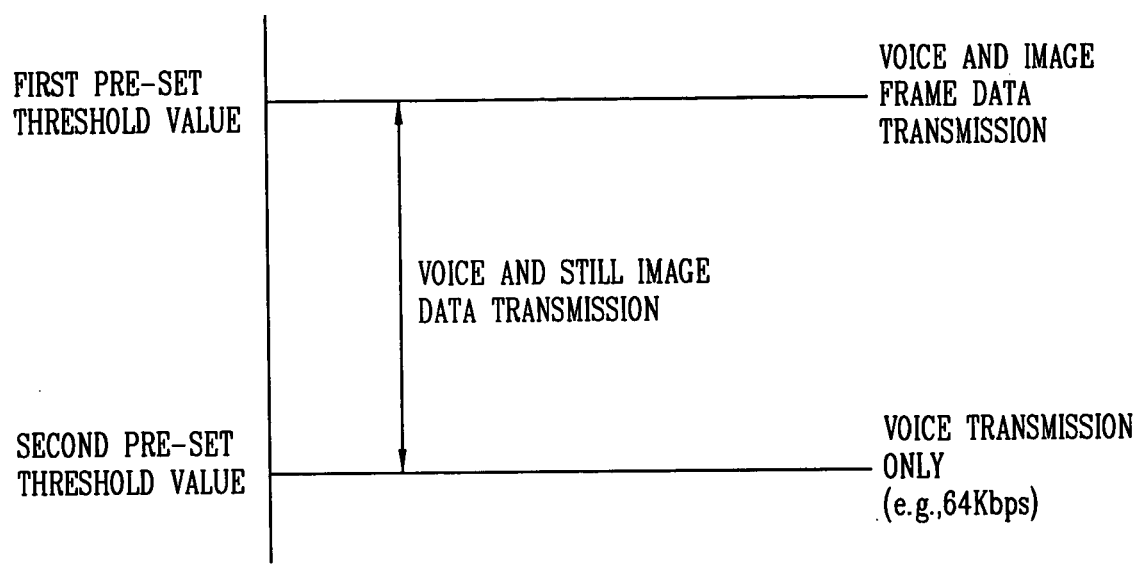
FIG. 6 is a diagram showing first and second pre-set threshold values that may be used to determine how signals may be selectively transmitted in accordance with one or more of the embodiments of the present invention.

If the current transmission rate of the wireless network is not smaller than the second pre-set threshold value (corresponding to Zone 1 in FIG. 6), the input selector inputs the selected still image, mixes it with the voice signal and transmits it (step S17). At this time, the input selector receives only the sill image and cuts off input of an image signal again.

If the current transmission rate of the wireless network is not greater than the second pre-set threshold value (corresponding to Zone 2 in FIG. 6), the input selector cuts off input of the voice signal, inputs the selected still image, and transmits it (step S18). Then, the input selector again cuts off input of the image signal and returns to the voice communication state (step S19). Thus, while the still image selected by the user is being input, the still image, instead of the voice signal, is transmitted. And, when transmission of the still image is terminated, only the voice signal is again transmitted.

In case that an error occurs while a voice signal and an image signal are being simultaneously transmitted due to a shortage of resources of the wireless network during video telephony, a still image selected by the user can be transmitted together with a voice signal or the still image can be transmitted with the voice signal cut off according to a transmission rate of the network.

As so far described, the method and apparatus for selectively transmitting an image of a mobile communication terminal have at least the following advantages. When the transmission rate of a wireless network becomes too low to transmit image frames derived from the terminal camera during normal video telephony, a still image selected by the user is transmitted. As a result, video telephony performed by transmitting the user-selected still image can be implemented. In addition, if the wireless network has the lowest transmission rate which allows only voice signal transmission, a voice signal maybe cut off and a still signal selected by the user may be transmitted. Accordingly, video telephony can be implemented and reliability for an image communication service can be enhanced. In at least one of the foregoing embodiments, image frame data may be understood to correspond to or include a moving picture signal.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for controlling communications in a mobile communication network, comprising: establishing a call between a calling terminal and a called terminal; comparing a network transmission rate to a first pre-set threshold value during the call; and if the transmission rate is not greater than the first threshold value, then: blocking transmission of video frame data from a camera of the calling terminal; accessing a still image of a user of the calling terminal in response to a user input signal; and transmitting a voice signal and the still image to the called terminal over the network, said method further comprising: after the video frame data is blocked, transmitting only the voice signal for a first period of time; interrupting transmission of the voice signal and transmitting only the still image during a second period of time; and resuming transmission of only the voice signal after transmission of the still image is completed.

2. The method of claim 1, wherein the first pre-set threshold value corresponds to a lowest network transmission rate which can support simultaneous transmission of the video frame data from the terminal camera and voice signals.

3. The method of claim 1, wherein the first pre-set threshold value corresponds to a network transmission rate which cannot support simultaneous transmission of the video frame data from the terminal camera and voice signals.

4. The method of claim 1, wherein the still image is captured using the camera of the calling terminal during the call in response to the user input signal.

5. The method of claim 1, wherein the still image is pre-stored in a memory of the terminal.

6. The method of claim 1, wherein if the transmission rate is greater than the first threshold value, then said transmitting farther comprises: mixing the still image with the voice signal; and transmitting the mixed signal to the network.

7. The method of claim 1, further comprising:
informing a user that the transmission rate is not greater than the threshold value.

8. A method for controlling communications in a mobile communication network, comprising:
(a) comparing a network transmission rate to a first pre-set threshold value during a call between a calling terminal and a called terminal;
(b) if the transmission rate is not greater than the first pre-set threshold value, informing a user accordingly;
(c) blocking input of video frame data from a camera of the calling terminal;
(d) if the user selects a still image, determining whether the network has a transmission rare greater than a second pre-set threshold value; and
(e) based on a result of (d), transmitting only the voice signal for a first period of time, interrupting transmission of the voice signal and transmitting the still image during a second period of time, and resuming transmission of only the voice signal.

9. The method of claim 8, wherein the first pre-set threshold value corresponds to a lowest network transmission rate winch can support simultaneous transmission of the one or more image frames from the terminal camera and voice signals.

10. An apparatus for controlling a mobile communication terminal, comprising: a controller which compares a network transmission rate with at least one pre-set threshold value during a call connected to the terminal and outputs a control signal for selectively blocking video frame data input from a terminal camera; and an input selector which blocks the video frame data and passes a still image of a user of the terminal in response to the control signal, the terminal transmitting a voice signal and the still image over a network during the call, wherein: if the network transmission rate is not greater than a first pre-set threshold value and not smaller than a second pre-set threshold value, the selector selects the still image and the voice signal for simultaneous transmission, and if the network transmission rate is not greater than the second pre-set threshold value, only the voice signal is transmitted for a first period of time. After which the transmission of the voice signal is interrupted and only the still image is transmitted during a second period of time, and then only the voice signal is transmitted after the second period of time.

11. A method for controlling a mobile communication terminal, comprising: comparing a network transmission rate to a first pre-set threshold value during a call coupled to the terminal; and if the transmission rate is not greater than the threshold value, blocking transmission of a moving picture signal derived from a terminal camera and transmitting a still image and a voice signal over a network, wherein said blocking and transmitting include: transmitting only a voice signal for a first period of time; interrupting transmission of the voice signal and transmitting only the still image; and resuming transmission of only the voice signal after transmission of the still image is completed.

12. The method of claim 11, wherein the first pre-set threshold value corresponds to a lowest network transmission rate which can support simultaneous transmission of the moving picture signal and the voice signal.

13. The method of claim 11, wherein the first pre-set threshold value corresponds to a network transmission rate which cannot support simultaneous transmission of the moving picture signal and the voice signal.

14. The method of claim 11, wherein the still image is selected by a user.

15. The method of claim 11, wherein the still image is pre-stored in a memory of the terminal.

16. The method of claim 11, wherein if the transmission rate is greater than the threshold value: mixing the still image with a voice signal; and transmitting the mixed signal to the network.

17. The method of claim 11, further comprising:
informing a user that the transmission rate is not greater than the threshold value.

* * * * *